Nov. 2, 1965    V. A. ANDERSON ETAL    3,214,986
ADJUSTABLE PITCH SHEAVE

Filed Nov. 1, 1963    2 Sheets-Sheet 1

INVENTORS
VERN A. ANDERSON
GEORGE L. DURNEY, DECEASED
BY JUNE L. DURNEY, DISTRIBUTEE

BY Daniel H. Bobis
atty.

Nov. 2, 1965  V. A. ANDERSON ETAL  3,214,986
ADJUSTABLE PITCH SHEAVE
Filed Nov. 1, 1963  2 Sheets-Sheet 2
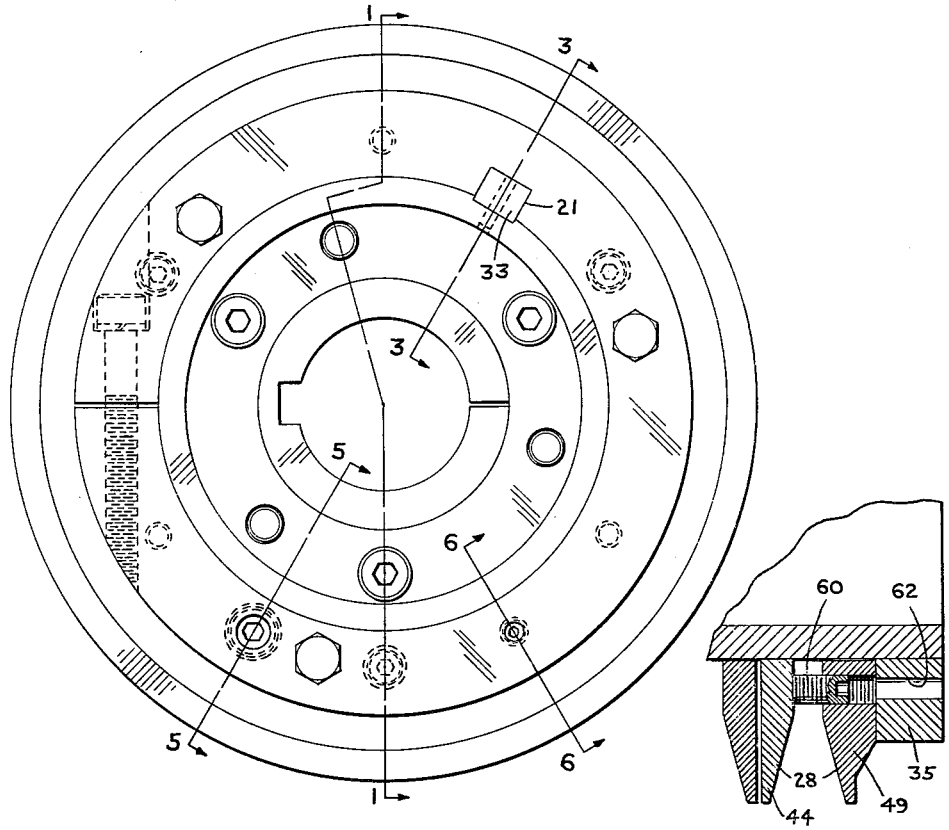
FIG. 2
FIG. 6
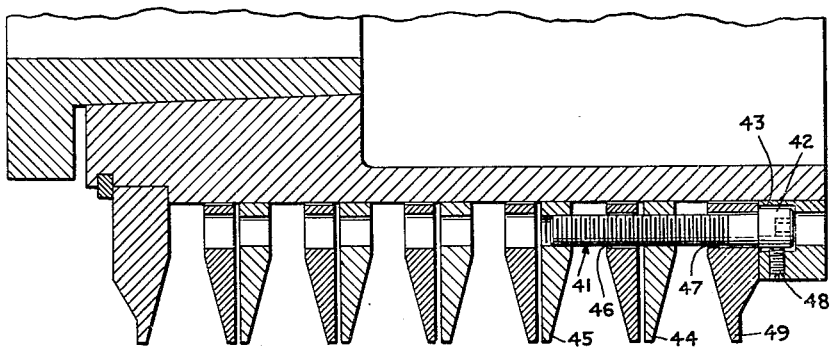
FIG. 5
INVENTORS
VERN A. ANDERSON
GEORGE L. DURNEY, DECEASED
BY JUNE L. DURNEY, DISTRIBUTEE
BY Daniel H. Bobis
ATTY

United States Patent Office 3,214,986
Patented Nov. 2, 1965

3,214,986
ADJUSTABLE PITCH SHEAVE
Vern A. Anderson, Oil City, Pa., and George L. Durney, deceased, late of Rouseville, Pa., by June L. Durney, widow, Rouseville, Pa., assignors to Worthington Corporation, Harrison, N.J., a corporation of Delaware
Filed Nov. 1, 1963, Ser. No. 320,961
11 Claims. (Cl. 74—230.17)

This invention relates to an adjustable pitch sheave wherein a movable member is moved relative a fixed member to vary the dimension of the belt engaging groove formed between the members. More particularly the invention relates to means for supporting the movable members a suitable dimension from the outer bearing surface of the supporting hub.

In the prior art many attempts have been made to provide a simple, economic and durable device for use in mechanical power transmission applications. These prior art devices teach the mounting of the movable and fixed members or discs either directly on the bearing surface of the hub or sleeve of the members or telescoped so that the member mounted directly on the sleeve supports the other member of the sleeve, in either of the foregoing applications the movable members are either supported directly on the hub or indirectly on the hub as in the case wherein a telescoping arrangement is used.

It has been found that these prior art devices while useful in application are susceptible to corrosion and additionally more complicated manufacturing techniques are required to produce them. More particularly when the movable face rides on the hub free slidability is impaired by corrosion and the like that forms between the portions of the face engaging the bearing surface of the hub.

In the case of the sleeves that are produced with telescoping faces it is obvious that complicated manufacturing techniques are required in connection with the production of the faces so that the essential movement between the fixed and movable faces is realized.

The adjustable pitch sheave of this invention overcomes the above disadvantages by providing a fixed face and a movable face mounted relative the outer bearing surface of the hub with means that hold the movable face a spaced dimension from the outer bearing surface of the hub.

Accordingly it is an object of this invention to provide an improved adjustable pitch sheave that is simple in construction and more durable than prior art devices.

It is another object of this invention to provide a new and improved adjustable pitch sheave.

Other objects and advantages of the invention including the basic design and the nature of the improvements thereon will appear from the following description taken in conjunction with the following drawings, in which:

FIGURE 2 is an end view of the adjustable pitch sheave.

FIGURE 5 is a partial vertical section showing another form of adjusting mechanism and taken on line 5—5 of FIGURE 2.

FIGURE 6 is a view taken along line 6—6 of FIGURE 2 showing locking means.

The drawings are to be understood to be for the purpose of illustrating and disclosing a typical or preferred form of the improvements contemplated herein and in the drawings like reference characters identify the same parts in the several views.

Figure 1:
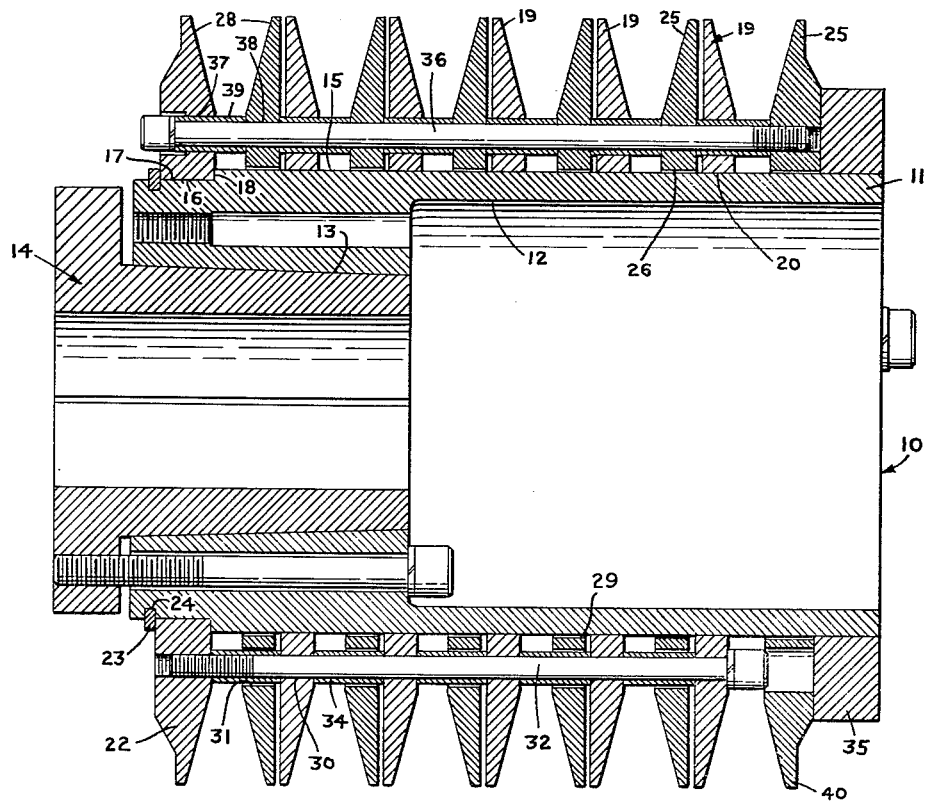
FIGURE 1 is a vertical section of the adjustable pitch sheave constructed according to the present invention and taken on line 1—1 of FIGURE 2.

Referring to the exemplary embodiment of the invention in FIGURE 1 there is shown an adjustable pitch sheave, generally designated 10, adapted to be mounted on a suitable mechanical power transmission element. The sheave is provided with a sleeve or hub 11. The sleeve is longitudinally bored to a large dimension 12 at one end and to a lesser dimension 13 at the other end. A mounting hub 14 is fixed to the portion of the sleeve that is of lesser dimension. As is shown in the drawings the mounting hub 14 is of the split tapered type which is purchasable on the open market and useful for mounting a member on a power transmission element. The sleeve 11 has an outer bearing surface 15 which is preferably cylindrically shaped and a recess 16 which forms what may conveniently be termed a second outer bearing surface 17 on a small portion of the hub 11. By providing a recess on the outer bearing surface a stop face 18 is formed and the purpose of which will become evident from the description which follows.

Figure 3:
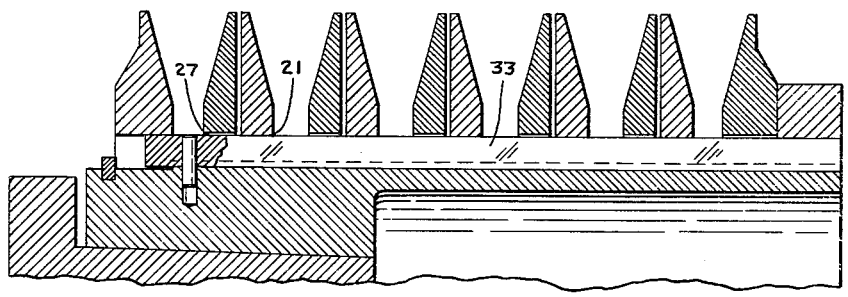
FIGURE 3 is a partial vertical section taken on line 3—3 of FIGURE 2.

In the drawings there is shown a plurality of annular members designated 19 which are mounted about the outer bearing surface 15 and in engagement with this outer bearing surface. These annular members 19 include a longitudinal bore 20 each provided with a keyway 21, FIGURE 3, and the bore formed in each of the members is such that the first annular members will slide snugly over the outer bearing surface 15. The annular members or discs of the first set 19 are spaced from each other and one disc 22 is mounted in the recess 16 so that it abuts the stop face 18. A snap ring 23 is shown as being mounted in a cut 24 to fix the disc 22 in position. A second set of annular members 25 is also disposed about the outer bearing surface of the hub 11. A longitudinal bore 26 and keyway 27, FIGURE 3, is also provided for each of the members or discs of the second set 25. The discs of the second set of members are each mounted between alternate discs of said first set of members 19 to form belt engaging grooves 28 as is clearly shown in the drawings. As was mentioned hereinabove and in order to eliminate the effect that corrosion has on prior art devices the discs of the second set of members 25 are all mounted a spaced dimension 29 from the outer bearing surface of the hub 11. To this end the longitudinal bore 26 of the second set of annular members is a greater dimension than the longitudinal bore 20 of the first set of annular members. Bores 30 and 31 are respectively formed in each of the discs of the first and second sets of members 19 and 25. Means taking the form of a bolt 32 is disposed through the bores 30 and 31 and threaded into the disc 22 to fix the first set of discs to the hub and hold the second set of discs a spaced dimension 29 from the outer bearing surface 15. A key 33, FIGURE 3, is seated on the hub 11 and is disposed in the keyways 21 and 27 to prevent rotation of the discs around the hub 11.

The bolt 32 supports the second set of members through a spacer member 34 which is mounted in each of the bores 31 formed in each of the discs of the second set of members.

A ring 35 is connected to the end of the hub 11 that is opposite to the recess 16 and holds the discs in operating position.

Means taking the form of a bolt 36 is provided for interconnecting the second set of members so that they can be moved along the outer bearing surface 15 in unison. The bolt 36 is disposed in second bores 37 and 38 respectively formed in each of the discs of the first and second sets 19 and 25. More particularly the bolt 36 is disposed through spacers 39 which are mounted in the bores 37 to support the fixed discs of the first set 19 and said spacers extend towards the discs of the second set 25 and abut a face of each of these discs. The bolt 36 is threaded into one disc 40 of the second set of members 25 to unify the discs in movement.

Referring to FIGURE 5 adjusting means 41 is shown as comprising a bolt member having a head 42 mounted in a counterbore formed in ring 35 and threadedly connected to discs 44 and 45 of the first set and extending through bores 46 and 47 in the second set.

In operation the set screw 48 is loosened and the bolt 41 moved clockwise to move disc 49 of the second set so that the desired belt engaging groove 28 is provided. Rotation of the bolt 41 in a counterclockwise direction will permit movement of the discs of the second set to another belt engaging groove dimension.

Figure 4:
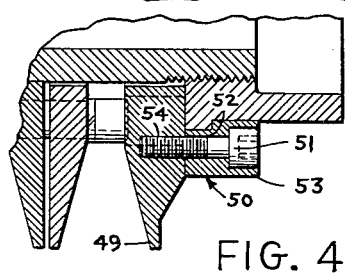
FIGURE 4 is a partial sectional view showing a form of adjusting mechanism that may be used for moving the slidable members.

FIGURE 4 shows a modified form of adjusting means designated 50. Except for the modified form of adjusting means the construction shown in FIGURE 4 is otherwise identical to that shown in FIGURE 1 of the drawings and described hereinabove. Hence only a fragmentary portion of the adjustable pitch sheave is shown. Thus FIGURE 4 shows the adjustable means as including a bolt or screw 51 threadedly mounted in a bore 52 in ring 53 and bore 54 of disc 49.

In order to maintain the adjustable operative position of the sheave, regardless of whether such position was obtained by the adjustment means illustrated in FIGURE 1, 4, or 5, a locking means is provided. At least one lockscrew 60 is threadedly connected as shown in FIGURE 6 to disc 49 and has the end thereof remote from ring 35 bear against disc 44 to exert sufficient side force to lock the sheaves in adjusted position. Further this locking in assembled position prevents fretting corrosion in the sheave mechanism by removing all clearances throughout the adjusting system. Prior to adjustment of the belt engaging groove 28, lockscrew 60 is suitably disengaged from disc 44 by extending a wrench through hole 62 in ring 35 and subsequent to said adjustment lockscrew 60 is bearingly engaged with disc 44 to lock the sheave mechanism in adjusted position.

Although this invention has been described with reference to specific apparatus it will be appreciated that a wide variety of changes may be made within the ability of one skilled in the art without departing from the scope of this invention. For example, some of the components of the apparatus may be reversed, certain features of the invention may be used independently of others, and equivalents may be substituted for the apparatus, all within the spirit and scope of the invention as defined in the appended claims.

What is claimed is:

1. An adjustable pitch sheave including a hub having a cylindrical outer bearing surface, a recess formed in a portion of said cylindrical outer bearing surface to form a second cylindrical outer bearing surface and a stop face, a first disc having a longitudinal cylindrical bore mounted in said recess in engagement with said second cylindrical outer bearing surface and said first disc abutting said stop face, a second disc having a longitudinal cylindrical bore disposed about said hub and spaced from said first disc, said first and second discs coacting to form a belt engaging groove, a threaded bore formed in said first disc, a bore formed in said second disc, bolt means disposed through said bore of said second disc and threaded in said threaded bore of said first disc, said bolt means holding said second disc a spaced dimension from said cylindrical outer bearing surface, and means connected to said second disc to move same relative to said first disc to change the size of said belt engaging groove.

2. The combination claimed in claim 1 wherein spacers having longitudinal bores are disposed in each of the discs and said bolt means extends through said bores to support said disc through said spacers.

3. An adjustable pitch sheave including a hub having a cylindrical outer bearing surface, a recess formed in a portion of said cylindrical outer bearing surface to form a second cylindrical outer bearing surface and a stop face, a first disc having a longitudinal cylindrical bore mounted in said recess in engagement with said second cylindrical outer bearing surface and said first disc abutting said stop face, a second disc having a longitudinal cylindrical bore disposed about said hub and spaced from said first disc, said first and second discs coacting to form a belt engaging groove, a threaded bore formed in said first disc, a bore formed in said second disc, bolt means disposed through said bore of said second disc and threaded in said threaded bore of said first disc, said bolt means holding said second disc a spaced dimension from said cylindrical outer bearing surface, a ring member mounted about said cylindrical outer bearing surface and connected to said hub, and a bolt means mounted in said ring member and threadedly connected to said second disc to move same relative said first disc to change the size of said belt engaging groove.

4. An adjustable pitch sheave including a hub having a cylindrical outer bearing surface, a recess formed in a portion of said cylindrical outer bearing surface to form a second cylindrical outer bearing surface and a stop face, a first disc having a longitudinal cylindrical bore mounted in said recess in engagement with said second cylindrical outer bearing surface and said first disc abutting said stop face, a second disc having a longitudinal cylindrical bore disposed about said hub and spaced from said first disc, said first and second discs coacting to form a belt engaging groove, means fixing said first disc to said hub and holding said second disc a spaced dimension from said cylindrical outer bearing surface, a ring member mounted about cylindrical outer bearing surface and connected to said hub, and a bolt means mounted in said ring member and threadedly connected to said second disc to move same relative said first disc to change the size of said belt engaging groove.

5. An adjustable pitch sheave including a hub having a cylindrical outer bearing surface, a recess formed in a portion of the cylindrical outer bearing surface to form a second cylindrical outer bearing surface and a stop face, a first set of discs each having longitudinal cylindrical bores mounted about said hub, one of said discs of said first set being mounted in said recess and in engagement with said second cylindrical outer bearing surface, and said one disc abutting said stop face, the remaining disc of said first set being in engagement with said cylindrical outer bearing surface, each of said discs of said first set being spaced from each other, a second set of discs each having longitudinal cylindrical bores slidably disposed about said hub and said discs of said second set being disposed between alternate discs of said first set, the discs of said first set coacting with the discs of said second set to form a plurality of belt engaging surfaces, means connecting said discs of said first set together and fixing said first set of discs to said hub, means connecting said second set of discs together and holding said discs of said second set a spaced dimension from said cylindrical outer bearing surface, and means connected to one of said discs of said second set to move each of said discs of said second set relative the discs of said first set to change the size of said belt engaging grooves.

6. The combination claimed in claim 5 wherein locking means are operatively disposed between adjacent discs of said first set of discs and said second set of discs.

7. The combination claimed in claim 6 wherein said locking means includes a locking screw threadedly disposed in one of said discs and adapted to bearingly engage said adjacent disc to lock said sheave in adjusted position.

8. An adjustable pitch sheave including a hub having a cylindrical outer bearing surface, a recess formed in a portion of the cylindrical outer bearing surface to form a second cylindrical outer bearing surface and a stop face, a first set of discs each having longitudinal cylindrical bores mounted about said hub, one of said discs of said first set being mounted in said recess and in engagement with said second cylindrical outer bearing surface, and said one disc abutting said stop face, the remaining disc of said first set being in engagement with said cylindrical outer bearing surface, each of said discs of said first set being spaced from each other, a second set of discs each having longitudinal cylindrical bores slidably disposed about said hub and said discs of said second set being disposed between alternate discs of said first set, the discs of said first set coacting with the discs of said second set to form a plurality of belt engaging surfaces, means connecting said discs of said first set together and fixing said first set of discs to said hub, means connecting said second set of discs together and holding said discs of said second set a spaced dimension from said cylindrical outer bearing surface, a ring member mounted about said cylindrical outer bearing surface and connected to said hub and a bolt means mounted in said ring member and threadedly connected to one of the discs of said second set to move each of said discs of said second set relative the discs of said first set to change the size of said belt engaging grooves.

9. The combination claimed in claim 8 wherein spacers having longitudinal bores are disposed in each of the discs and said bolt means extend through said bores to support said disc through said spacers.

10. An adjustable pitch sheave including a hub having a cylindrical outer bearing surface, a recess formed in a portion of the cylindrical outer bearing surface to form a second cylindrical outer bearing surface and a stop face, a first set of discs each having longitudinal cylindrical bores mounted about said hub, one of said discs of said first set being mounted in said recess and in engagement with said second cylindrical outer bearing surface, and said one disc abutting said stop face, the remaining disc of said first set being in engagement with said cylindrical outer bearing surface, each of said discs of said first set being spaced from each other, a second set of discs each having longitudinal cylindrical bores slidably disposed about said hub and said discs of said second set being disposed between alternate discs of said first set, the discs of said first set coacting with the discs of said second set to form a plurality of belt engaging surfaces, a theaded bore formed in the discs of said first set mounted in said recess and bores formed in each of the other discs of said first set, a bore formed in each of the discs of said second set, bolt means disposed through the bores in said discs of said first and second sets and said bolt means threaded into the threaded bore of the discs of said second set, bolt means disposed holding said second set of discs a spaced dimension from said cylindrical outer bearing surface, means fixing said first set of discs to said hub, and means connected to one of said discs of said second set to move each of said discs of said second set relative the discs of said first set to change the size of said belt engaging grooves.

11. An adjustable pitch sheave including a hub having a cylindrical outer bearing surface, a recess formed in a portion of the cylindrical outer bearing surface to form a second cylindrical outer bearing surface and a stop face, a first set of discs each having longitudinal cylindrical bores mounted about said hub, one of said discs of said first set being mounted in said recess and in engagement with said second cylindrical outer bearing surface, and said one disc abutting said stop face, the remaining discs of said first set being in engagement with said cylindrical outer bearing surface, each of said discs of said first set being spaced from each other, a second set of discs each having longitudinal cylindrical bores slidably disposed about said hub and said discs of said second set being disposed between alternate discs of said first set, the discs of said first set coacting with the discs of said second set to form a plurality of belt engaging grooves, a threaded bore formed in the disc of said first set mounted in said recess and bores formed in each of the other discs of said first set, a bore formed in each of the discs of said second set, bolt means disposed through the bores in said discs of said first and second sets and said bolt means threaded into the threaded bore of said disc mounted in said recess, said bolt means holding said second set of discs a spaced dimension from said cylindrical outer bearing surface, means fixing said first set of discs to said hub, a ring member mounted about said cylindrical outer bearing surface and connected to said hub, and a bolt means mounted in said ring member and connected to one of said discs of said second set to move each of said discs of said second set relative the discs of said first set to change the size of said belt engaging grooves.

References Cited by the Examiner

UNITED STATES PATENTS

| | | | |
|---|---|---|---|
| 2,254,045 | 8/41 | Nylin | 74—230.17 |
| 2,696,997 | 12/54 | McCloskey | 74—230.17 |
| 2,721,484 | 10/55 | Otto | 74—230.17 |
| 2,973,656 | 3/61 | Kurre | 74—230.17 |
| 3,108,483 | 10/63 | Williams | 74—230.17 |
| 3,114,271 | 12/63 | Davis | 74—230.17 |

DON A. WAITE, *Primary Examiner.*